US012592640B2

(12) United States Patent
Messina et al.

(10) Patent No.: US 12,592,640 B2
(45) Date of Patent: Mar. 31, 2026

(54) CIRCUIT AND METHOD FOR REDUCING DRIVING LOSSES IN GAN SWITCHES

(71) Applicant: STMicroelectronics International N.V., Geneva (CH)

(72) Inventors: Sebastiano Messina, Mascalucia (IT); Salvatore Mita, Canicattini Bagni (IT); Natale Aiello, Trecastagni (IT)

(73) Assignee: STMicroelectronics International N.V., Geneva (CH)

( * ) Notice: Subject to any disclaimer, the term of this patent is extended or adjusted under 35 U.S.C. 154(b) by 64 days.

(21) Appl. No.: 18/515,068

(22) Filed: Nov. 20, 2023

(65) Prior Publication Data

US 2025/0167679 A1    May 22, 2025

(51) Int. Cl.
*H02M 3/158*      (2006.01)
*H02M 1/088*      (2006.01)

(52) U.S. Cl.
CPC ........... *H02M 3/158* (2013.01); *H02M 1/088* (2013.01)

(58) Field of Classification Search
CPC .................................................... H02M 1/385
USPC ............. 323/271, 282, 351; 327/108–111, 2, 327/108–112
See application file for complete search history.

(56) References Cited

U.S. PATENT DOCUMENTS 7,240,254 B2 * 7/2007 Ong ....................... G11C 29/48
714/763
7,889,529 B2 * 2/2011 Asai ................... H03K 17/0822
327/434

7,948,220 B2 * 5/2011 Bahramian .......... H03K 17/145
323/224
8,928,363 B2   1/2015 Hatanaka et al.
9,660,637 B1   5/2017 Chuang et al.
(Continued)

FOREIGN PATENT DOCUMENTS

CN          102611288 A      7/2012
CN          104617752 A      5/2015
(Continued)

OTHER PUBLICATIONS

Grezaud et al., "A Gate Driver with Integrated Deadtime Controller," IEEE Transactions on Power Electronics, Institute of Electrical and Electronics Engineers, USA, vol. 31, No. 12, Dec. 1, 2016, pp. 8409-8421.

(Continued)

*Primary Examiner* — Thomas J. Hiltunen
(74) *Attorney, Agent, or Firm* — Seed Intellectual Property Law Group LLP

(57)          ABSTRACT

A half bridge circuit includes two GaN high electron mobility transistors (HEMT). A driver circuit generates a high side and low side driver signals corresponding to square wave. A driver deadtime is the period between during which both driver signals are low. A half bridge adjustment circuit is coupled between the driver and the half bridge circuit and generates a modified high side driver signal and a modified low side driver signal, each including a transition from a low voltage to an intermediate voltage during the corresponding deadtime and a transition from the intermediate voltage to a high voltage at an end of the corresponding deadtime. The half bridge adjustment circuit drives the gate terminals of the high side and low side transistors with the modified high side and low side driver signals.

17 Claims, 13 Drawing Sheets

(56)                 References Cited

U.S. PATENT DOCUMENTS

| | | | | |
|---|---|---|---|---|
| 10,388,778 B2 * | 8/2019 | Pandey | .............. | H10D 30/4755 |
| 10,454,456 B2 | 10/2019 | Zojer | | |
| 11,095,284 B2 * | 8/2021 | Bhat | ................. | H10D 62/8325 |
| 11,108,390 B2 | 8/2021 | Roig-Guitart et al. | | |
| 11,502,685 B2 * | 11/2022 | Karasawa | ........... | H02M 3/1588 |
| 11,848,599 B2 * | 12/2023 | Kimura | ........... | H03K 17/08142 |
| 2006/0087300 A1 * | 4/2006 | Endo | ....................... | G05F 1/618 |
| | | | | 323/282 |
| 2012/0032657 A1 * | 2/2012 | Dequina | ................. | H02M 1/38 |
| | | | | 327/109 |
| 2021/0211126 A1 * | 7/2021 | Roig-Guitart | .......... | H02M 1/08 |
| 2023/0130625 A1 | 4/2023 | Takubo et al. | | |
| 2024/0356430 A1 * | 10/2024 | Kiguchi | .............. | H02M 7/5387 |

FOREIGN PATENT DOCUMENTS

| | | |
|---|---|---|
| CN | 114915148 A | 8/2022 |
| JP | 6930266 B2 | 9/2021 |
| KR | 101197806 B1 | 11/2012 |

OTHER PUBLICATIONS

Kim et al., "Efficiency Improvment of GaN Dual-Active-Bridge DC-DC Converter with Three-level Active Gate Driver," 11th Interntional Conference on Power Electronics and ECCE Asia, Korean Institute of Power Electronics, May 22, 2023, pp. 360-365.
Takahashi et al., "A Three-Level GaN Driver for High False Turn-ON Tolerance with Minimal Reverse Conduction Loss," IEEE Open Journal of Power Electronics, vol. 4, Apr. 29, 2023, pp. 357-366.

* cited by examiner

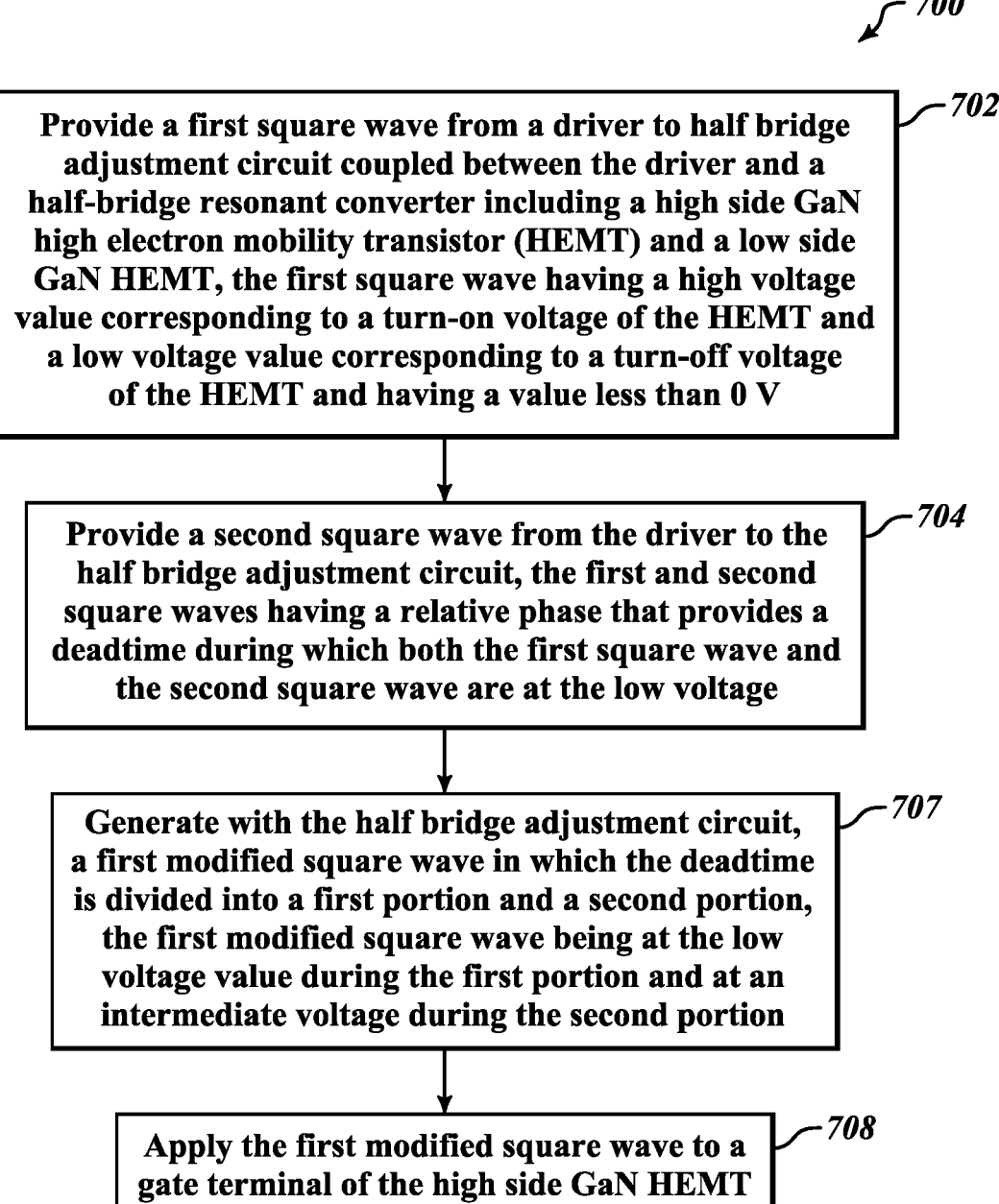

*700*

*702*

Provide a first square wave from a driver to half bridge adjustment circuit coupled between the driver and a half-bridge resonant converter including a high side GaN high electron mobility transistor (HEMT) and a low side GaN HEMT, the first square wave having a high voltage value corresponding to a turn-on voltage of the HEMT and a low voltage value corresponding to a turn-off voltage of the HEMT and having a value less than 0 V

*704*

Provide a second square wave from the driver to the half bridge adjustment circuit, the first and second square waves having a relative phase that provides a deadtime during which both the first square wave and the second square wave are at the low voltage

*707*

Generate with the half bridge adjustment circuit, a first modified square wave in which the deadtime is divided into a first portion and a second portion, the first modified square wave being at the low voltage value during the first portion and at an intermediate voltage during the second portion

*708*

Apply the first modified square wave to a gate terminal of the high side GaN HEMT

*FIG. 7*

CIRCUIT AND METHOD FOR REDUCING DRIVING LOSSES IN GAN SWITCHES

BACKGROUND

Technical Field

The present disclosure relates to half bridge circuits including field-effect high electron mobility transistor (HEMT) devices and to methods of driving the HEMT devices.

Description of the Related Art

HEMT devices are known in which a conductive channel is based on the formation of layers of two-dimensional electron gas (2DEG) with high mobility at a heterojunction, i.e., at the interface between semiconductor materials with different bandgaps. For instance, HEMT devices are known based on the heterojunction between an aluminum and gallium nitride (AlGaN) layer and a gallium nitride (GaN) layer.

HEMT devices based on AlGaN/GaN heterojunctions or heterostructures provide a wide range of advantages that make them particularly suitable for and widely used for different applications. For instance, the high breakdown threshold of HEMT devices is exploited for high-performance power switches; the high electron mobility in the conductive channel allows to obtain high-frequency amplifiers; moreover, the high electron concentration in the 2DEG allows to obtain a low ON-state resistance (RON). Furthermore, HEMT devices for radiofrequency (RF) applications typically provide better RF performance than similar silicon LDMOS devices.

GaN HEMT devices are becoming a popular solution for high-power density and high-efficiency solutions due to their very small size, high-switching speed, and low on-state resistance. GaN reverse conduction (third quadrant) in GaN devices is possible, but it presents a higher reverse voltage compared to the conventional silicon devices. The high value of this negative voltage could generate high losses.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide a method and system for driving a GaN based HEMT half-bridge circuit including modifying a deadtime portion of the driver signal applied to the transistors of the half bridge circuit. In particular, a half bridge adjustment circuit receives square wave driver signals for each of the transistors of the half bridge offset from each other such that there is a brief deadtime during which both driver signals are low. The half bridge adjustment circuit generates an adjusted driver signal circuit by adjusting the next rising square wave signal from a low value to an intermediate value after a first portion of the deadtime. Accordingly, the adjusted driver signal is low during a first portion of the deadtime and is at an intermediate value during a second portion of the deadtime. This can assist in reducing losses due to the reverse voltage during the deadtime.

In one embodiment, a method includes receiving, at a half bridge adjustment circuit, a first driver signal corresponding to a square wave and receiving, at the half bridge adjustment circuit, a second driver signal corresponding to a square wave. A first deadtime is a period between a falling edge of the second driver signal and a rising edge of the first driver signal. The method includes generating, with the half bridge adjustment circuit, a first modified driver signal corresponding to the first driver signal with a transition from a low voltage to an intermediate voltage during the first deadtime and a transition from the intermediate voltage to a high voltage at an end of the first deadtime. The method includes driving a gate terminal of a first transistor of a half bridge circuit with the first modified driver signal.

In one embodiment, a device includes half bridge circuit. The half bridge circuit includes a high side transistor and a low side transistor coupled to the high side transistor at an intermediate node. The device includes a driver configured to generate a high side driver signal corresponding to a square wave and a low side driver signal corresponding to a square wave. A first deadtime is a period between a falling edge of the low side driver signal and a rising edge of the high side driver signal. The device includes a half bridge adjustment circuit coupled between the driver and the half bridge circuit. The half bridge adjustment circuit is configured to generate a modified high side driver signal corresponding to the high side driver signal with a transition from a low voltage to an intermediate voltage during the first deadtime and a transition from the intermediate voltage to a high voltage at an end of the first deadtime. The half bridge adjustment circuit is configured to drive a gate terminal of the high side transistor of a half bridge circuit with the modified high side driver signal.

In one embodiment, a method includes providing a first square wave from a driver to half bridge adjustment circuit coupled between the driver and a half-bridge resonant converter including a high side GaN high electron mobility transistor (HEMT) and a low side GaN HEMT. The first square wave has a high voltage value corresponding to a turn-on voltage of the HEMT and a low voltage value corresponding to a turn-off voltage of the HEMT and having a value less than 0 V. The method includes providing a second square wave from the driver to the half bridge adjustment circuit. The first and second square waves have a relative phase that provides a deadtime during which both the first square wave and the second square wave are low. The method includes generating with the half bridge adjustment circuit, a first modified square wave in which the deadtime is divided into a first portion and a second portion. The first modified square wave is at the low voltage value during the first portion and at an intermediate voltage during the second portion. The method includes applying the first modified square wave to a gate terminal of the high side GaN HEMT.

BRIEF DESCRIPTION OF THE SEVERAL VIEWS OF THE DRAWINGS

FIG. 7 is a flow diagram of a method for operating a half bridge circuit, in accordance with one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
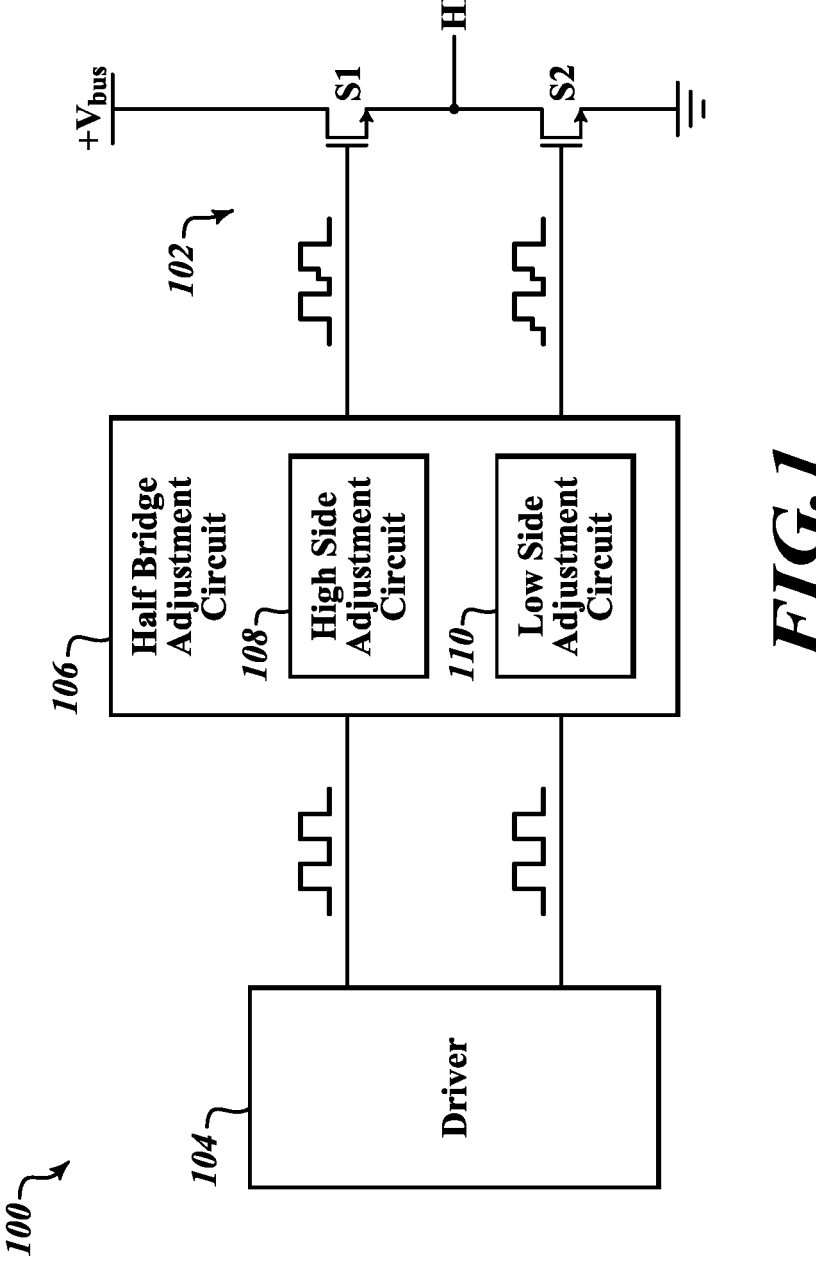
FIG. 1 is a block diagram of a system 100 including a half bridge circuit and the half bridge adjustment circuit, in accordance with one embodiment.

FIG. 1 is a block diagram of a half bridge system 100, in accordance with one embodiment. The half bridge system 100 includes a half bridge circuit 102, a driver 104, and a half bridge adjustment circuit 106. As will be set forth in more detail below, the half bridge adjustment circuit 106 and the driver 104 cooperate to effectively drive the half bridge circuit 102 in a power efficient manner.

The half bridge circuit 102 includes a first transistor S1 and a second transistor S2. The first transistor S1 includes a drain terminal coupled to a supply voltage Vbus, a gate terminal coupled to the half bridge adjustment circuit 106, and a source terminal coupled to the half bridge node HB. The second transistor S2 includes a drain terminal coupled to the half bridge node HB, a gate terminal coupled to the half bridge adjustment circuit 106, and the source terminal coupled to ground. Accordingly, the transistors S1 and S2 are coupled together in a half bridge configuration.

In one embodiment, the transistors S1 and S2 are HEMT devices. In one embodiment, the transistors S1 and S2 are GaN based HEMT devices. The use of GaN HEMT devices provides various benefits. For example, GaN HEMT devices can enable high frequency operation at high voltages (e.g., 600 V or more between terminals) with low power consumption. Further details regarding the structure of a GaN HEMT device are provided in relation to FIG. 5.

In one embodiment, the driver 104 provides a first square wave signal for driving the gate terminal of the transistor S1 and the second square wave signal for driving the gate terminal of the transistor S2. It is beneficial to ensure that the transistors S1 and S2 are never both conducting at the same time. Accordingly, the driver 104 generates the first and second square waves with the relative phase that provides a deadtime during each half cycle. The deadtime corresponds to a period of time during which both square wave signals are low.

However, there may be power losses that occur during the deadtime periods. In particular, in some schemes there is a reverse conduction time associated with each HEMT device of the half bridge circuit.

During the reverse conduction time there may be a reverse voltage value $V_{SD}$ corresponding the source voltage minus the drain voltage. The reverse voltage $V_{SD}$ value may be given by the following formula:

$$V_{SD} = V_{gs(th)} - V_{gs(off)},$$

where Vgs(th) is the gate threshold voltage and Vgs(off) is the off voltage applied to the gate terminal of the transistor to turn off the transistor.

In one embodiment, the gate threshold Vgs(th) is between one voltage and 2.6 V. The off voltage Vgs(off) can be between −3 V and −10 V. Other voltages can be utilized without departing from the scope of the present disclosure. As can be seen, the off voltage Vgs(off) has a negative value. The negative value of Vgs(off) may be beneficial for faster and robust turn off with noise immunity. This can result in $V_{SD}$ reaching relatively high values. Although GaN HEMT devices present reverse conduction capabilities, the consequent power losses introducing the space can limit advantages with respect to standard MOS technologies. The power loss Preverse during the reverse conduction can be given with the following formula:

$$P_{reverse} = V_{SD} \times I_{av} \times Tr \times f_{sw},$$

where Iav is the average reverse conduction current, Tr is the duration of the reverse time, and fsw is the switching frequency.

In one example of a GaN based 250 W half bridge resident converter, $V_{SD}$ may be 8.6 V, Iav may be 2 A, the reverse time Tr may be 200 ns, and the switching frequency fsw may be 250 kHz. This results in a reverse power loss Preverse of 0.86 W. If the frequency is increased to 1 MHz, the losses become 3.44 W.

Figure 2A:
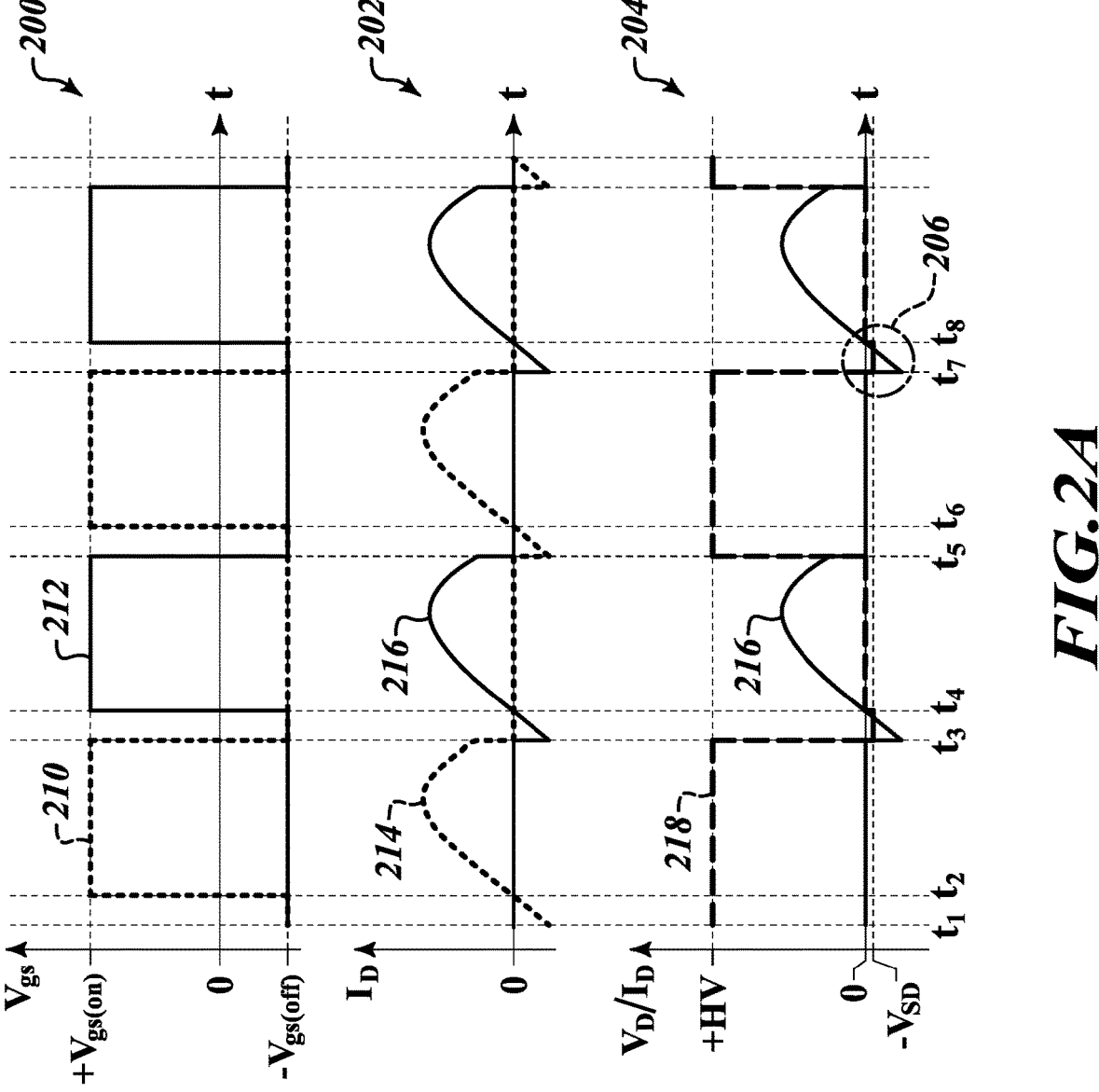
FIGS. 2A and 2B are graphs illustrating signals of features associated with operating a half bridge circuit.
Figure 2B:
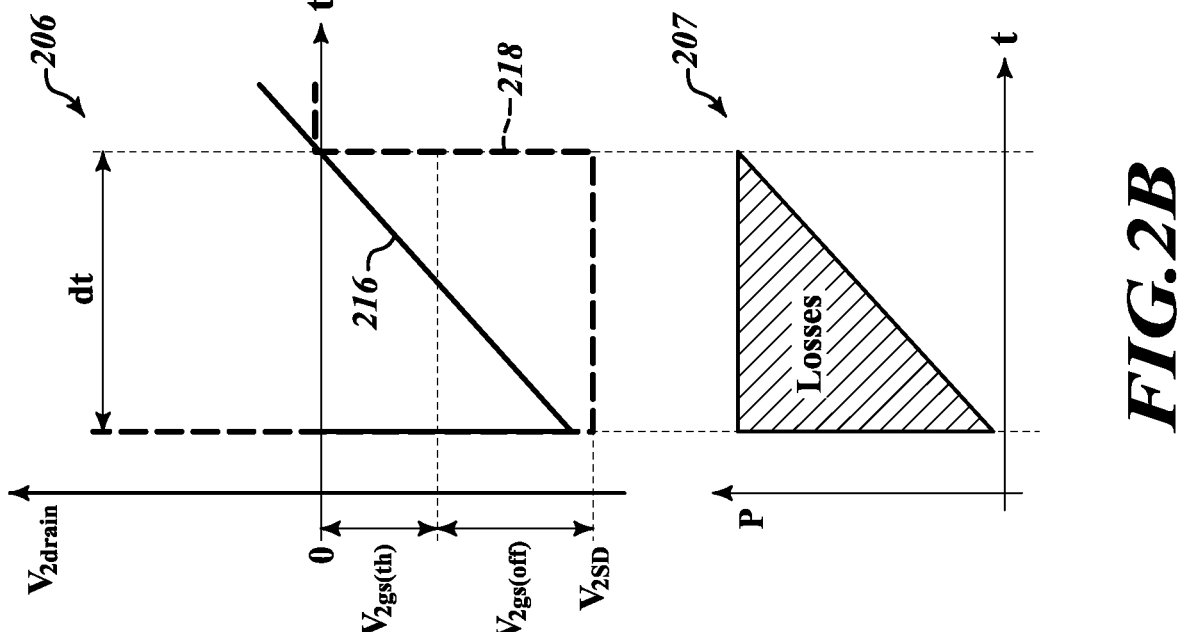

Prior to describing the function of the half bridge adjustment circuit 106, it is beneficial to discuss voltages and currents associated with operation of the half bridge circuit without adjusting the square waves provided by the driver 104 as shown in relation to FIGS. 2A and 2B.

FIG. 2A includes a graph 200 of a first square wave 210 and a second square wave 212 applied without modification to the gate terminals of switches S1 and S2 respectively. Each of the square waves 210 and 212 and slay between a low value Vgs(off) and a high value Vgs (on). The phases of the square waves 210 and 212 are offset such that there is deadtime between t1 and t2, between times t3 and t4, between times t5 and t6, and between times t7 and t8.

The graph 202 illustrates the currents 214 and 216 flowing through the transistors S1 and S2 respectively. As can be seen in the graph 202, there is a negative current that flows during the deadtime preceding the next rising edge of the corresponding square wave. For example, during the deadtimes preceding a rising edge of the square wave 212 of the transistor S2, the current 216 has a negative value corresponding to a reverse conduction current. During the deadtimes preceding a rising edge of the square wave 210, the current 214 has a negative value corresponding to a reverse conduction current of the transistor S1.

The graph 204 illustrates drain voltage 218 and the drain current 216 of the transistor S2. During the deadtimes preceding a rising edge of 212, the drain voltage $V_{SD}$ has a negative value, resulting in the reverse conduction current. Outside of those deadtimes, the drain voltage 218 has a value of either 0 V or a high-voltage value HV. The graph 204 also illustrates a portion 206 that is an enlarged in FIG. 2B. The portion 206 corresponds to the deadtime between times t7 and t8 preceding the rising edge of the second square wave signal 212.

In FIG. 2B, the graph 206 illustrates the drain voltage of the transistor S2. The graph 207 illustrates the power losses Preverse associated with the reverse conduction time of the transistor S2. As can be seen, the drain voltage of the transistor S2 drops the high voltage value HV to the negative voltage value $V_{2SD}$ at time T7. The graph 206 illustrates the threshold value V2$gs$(th) of the transistor S2 and the off-voltage value V2$gs$(off). This results in relatively high power losses during the reverse conduction time.

Returning to FIG. 1, embodiments of the present disclosure reduce the reverse power losses by implementation of the half bridge adjustment circuit 106. In particular, the driver 104 provides the first and second square waves to the half bridge adjustment circuit 106. The half bridge adjustment circuit 106 generates adjusted driver signals and provides them to the gate terminals of the transistors S1 and S2 to drive the transistors S1 and S2.

In one embodiment, the half bridge adjustment circuit 106 includes a highside adjustment circuit 108 that generates a highside adjusted driver signal from the first square wave signal and applies the highside adjusted driver signal to the gate terminal of the highside transistor S1. The half bridge adjustment circuit 106 includes a low side adjustment circuit 110 that generates a low side adjusted driver signal from the second square wave signal and applies the low side adjusted driver signal to the gate terminal of the low side transistor S2.

The half bridge adjustment circuit 106 operates by dividing each deadtime dt into a first deadtime portion dt1 and a second deadtime portion dt2. For the deadtimes preceding a rising edge of the first square wave 210, the adjusted highside driver signal is at the low voltage value during the first deadtime portion dt1. However, at the beginning of the second deadtime portion dt2, the adjusted highside driver signal transitions to an intermediate voltage between the low voltage and the high voltage. Likewise, for the deadtimes preceding a rising edge of the second square wave 212, the adjusted highside driver signal is at the low voltage value during the first deadtime portion dt1. However, at the beginning of the second deadtime portion dt2, the adjusted highside driver signal transitions to an intermediate voltage between the low voltage and high voltage. As will be set forth in more detail below, this greatly reduces the reverse conduction power losses.

For the following discussion regarding the adjusted driver signals, deadtimes preceding the rising edge of the first square wave 210 will be called first deadtimes. deadtimes preceding the rising edge of the second square wave 212 will be called second deadtimes. Each first deadtime has a first deadtime portion dt1 and a second deadtime portion dt2. Each second deadtime has a first deadtime portion dt1 and a second deadtime portion dt2.

Figure 3A:
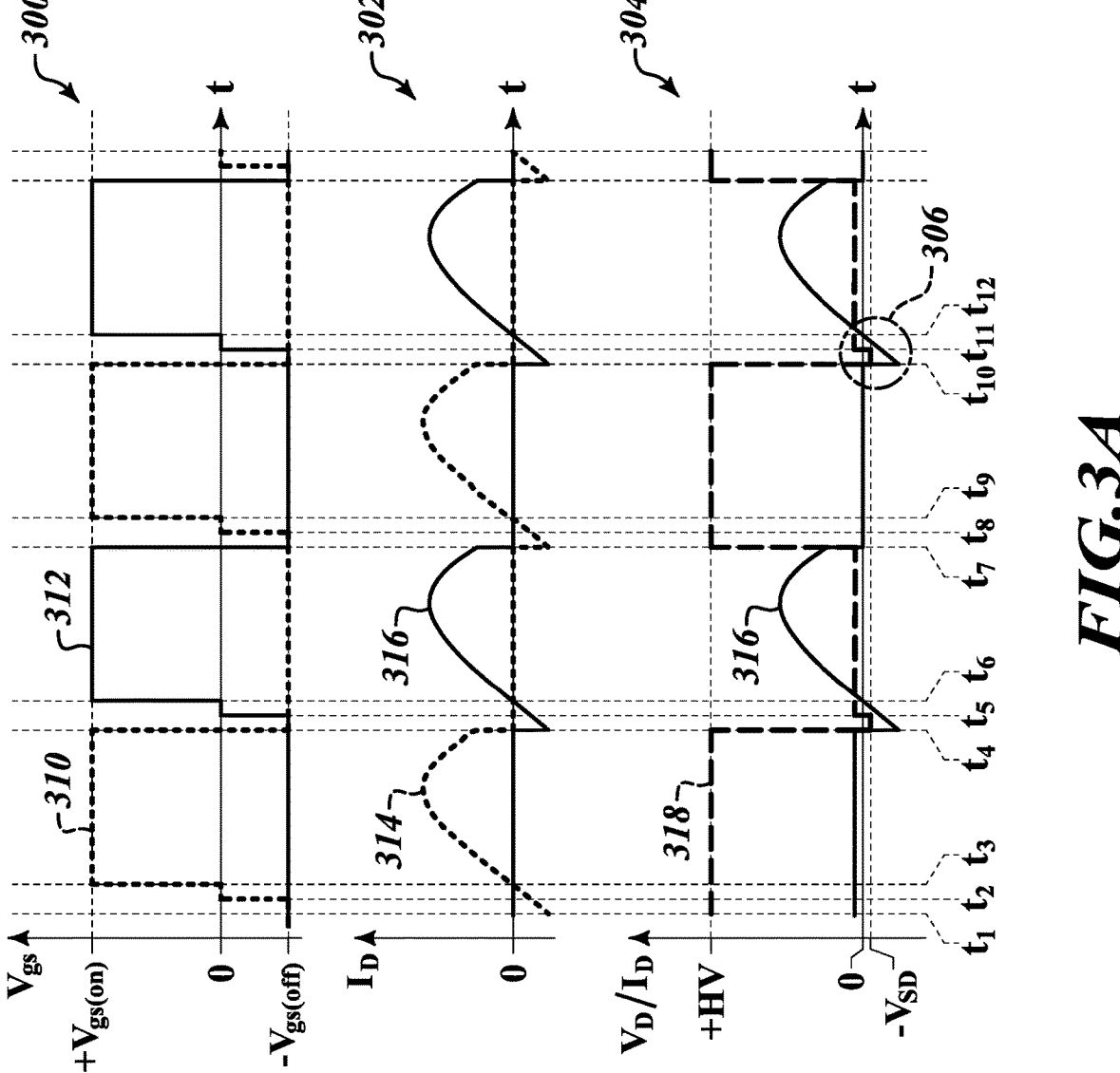
FIGS. 3A and 3B are graphs illustrating signals of features associated with operating a half bridge circuit, in accordance with one embodiment.

FIG. 3A includes a graph 300 illustrating the highside adjusted driver signal 310 and the low side adjusted driver signal 312. There are first deadtimes between times t1 and t3, and between times t7 and t8. There are second deadtime is between times t4 and t6, and between times t10 and t12.

For the first deadtime between times t1 and t3, there is a first deadtime portion between times t1 and t2. There is a second deadtime portion between times t2 and t3. For the first deadtime portion dt1, the highside adjusted driver signal 310 has the low value of –Vgs(off). For the second deadtime portion dt2 between times t2 and t3, the highside adjusted driver signal 310 has an intermediate value. In one example, the intermediate value may be about 0 V, or slightly less than 0 V. The low side adjusted driver signal 312 is at the low value during the first deadtime between times t1 and t3. The signals are the same for the other first deadtimes.

For second deadtime between times t4 and t6, there is a first deadtime portion between times t4 and t5. There is a second deadtime portion between times t5 and t6. For the first deadtime portion dt1, the low side adjusted driver signal 312 has the low value of –Vgs(off). For the second deadtime portion dt2 between times t5 and t6, the low side adjusted driver signal 312 has the intermediate value. The highside adjusted driver signal 310 is at the low value during the second deadtime between times t4 and t6. The signals are the same for the other second deadtimes.

The graph 302 illustrates the drain currents 314 and 316 associated with the transistors S1 and S2 when receiving the adjusted driver signals 310 and 312. The general form of the drain currents 314 and 316 is substantially similar to the general form of the drain currents 214 and 216. However, as will be set forth in more detail below, there are reduced power losses during the reverse conduction times.

The graph 304 illustrates drain voltage 318 and the drain current 316 of the transistor S2. During the first deadtime portions dt1 of second deadtimes preceding a rising edge of 312, the drain voltage $V_{SD}$ has a negative value. During the second deadtime portions dt2 of second deadtimes preceding a rising edge of 312, the drain voltage has a value of about zero. Outside of those deadtimes, the drain voltage 218 has a value of either 0 V or a high-voltage value HV. The graph 304 also illustrates a portion 306 that is an enlarged in FIG. 3B. The portion 306 corresponds to the deadtime between times t10 and t12 preceding the rising edge of the low side adjusted driver signal 312.

Figure 3B:
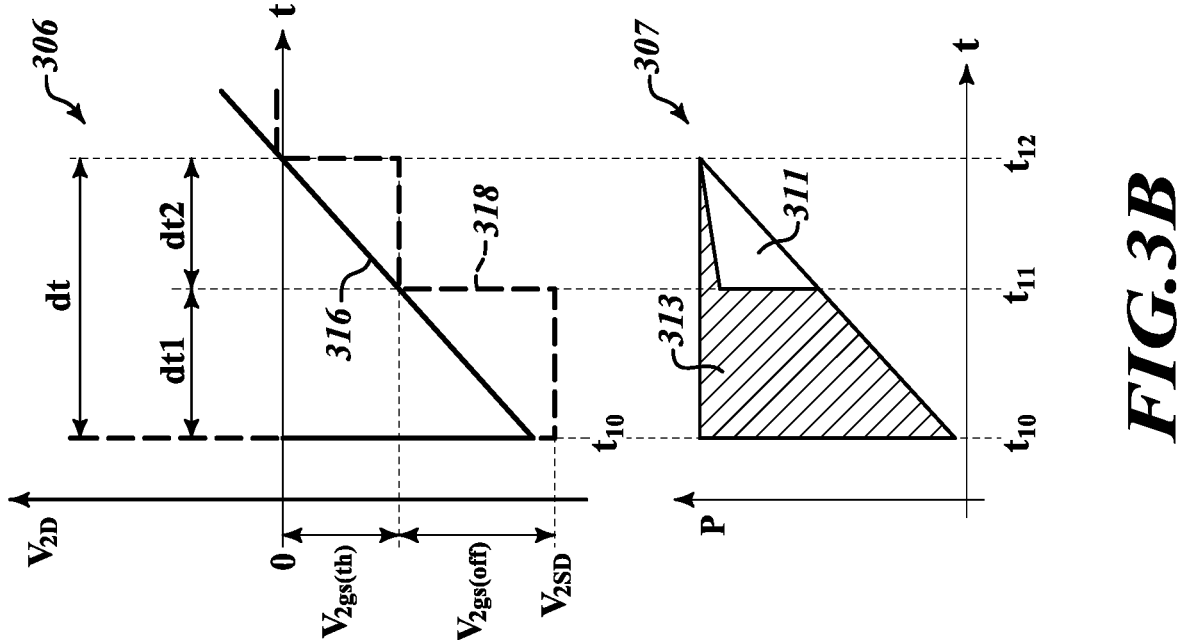

In FIG. 3B, the graph 306 illustrates the drain voltage of the transistor S2. The graph 307 illustrates the power losses Preverse associated with the reverse conduction time of the transistor S2. As can be seen, the drain voltage of the transistor S2 drops from the high voltage value HV to the negative voltage value $V_{2SD}$ at time T10 and remains there for the first deadtime portion dt1. At the transition to the second deadtime portion dt2, the drain voltage goes to an intermediate value for the remainder of the second deadtime portion dt2. The result is that during the second deadtime portion, there are greatly reduced power losses, as can be seen in the graph 307. This is because the magnitude of the source to drain voltage has been reduced. Because the reverse power loss is a factor of both the average current and the source to drain voltage, the reduced source to drain voltage results in reduced power losses. The portion 313 of the graph 307 corresponds to the power losses. The portion 311 illustrates power savings compared to the scheme shown in relation to FIG. 2B.

While FIG. 3A as illustrated a first deadtime portion dt1 substantially equal to the second deadtime portion dt2, in practice, it may be beneficial to have the second deadtime portion dt2 a longer than the first deadtime portion dt1. This can result in further reduced power losses. In one embodiment, the second deadtime portion dt2 is twice as long as the first deadtime portion dt1. In one embodiment, the second deadtime portion dt2 is more than three times as long as the first deadtime portion dt1.

While FIG. 3A has illustrated that the value of the adjusted driver signal has a single step at the interface between dt1 and dt2, in practice, there can be multiple steps in which the adjusted driver signal transitions to multiple different intermediate voltage values before going high at the end of the deadtime. Furthermore, the adjusted driver signals can have linear increases or nonlinear but continuous increases rather than steps various waveforms can be utilized for the adjusted driver signals without departing from the scope of the present disclosure.

Figure 4A:
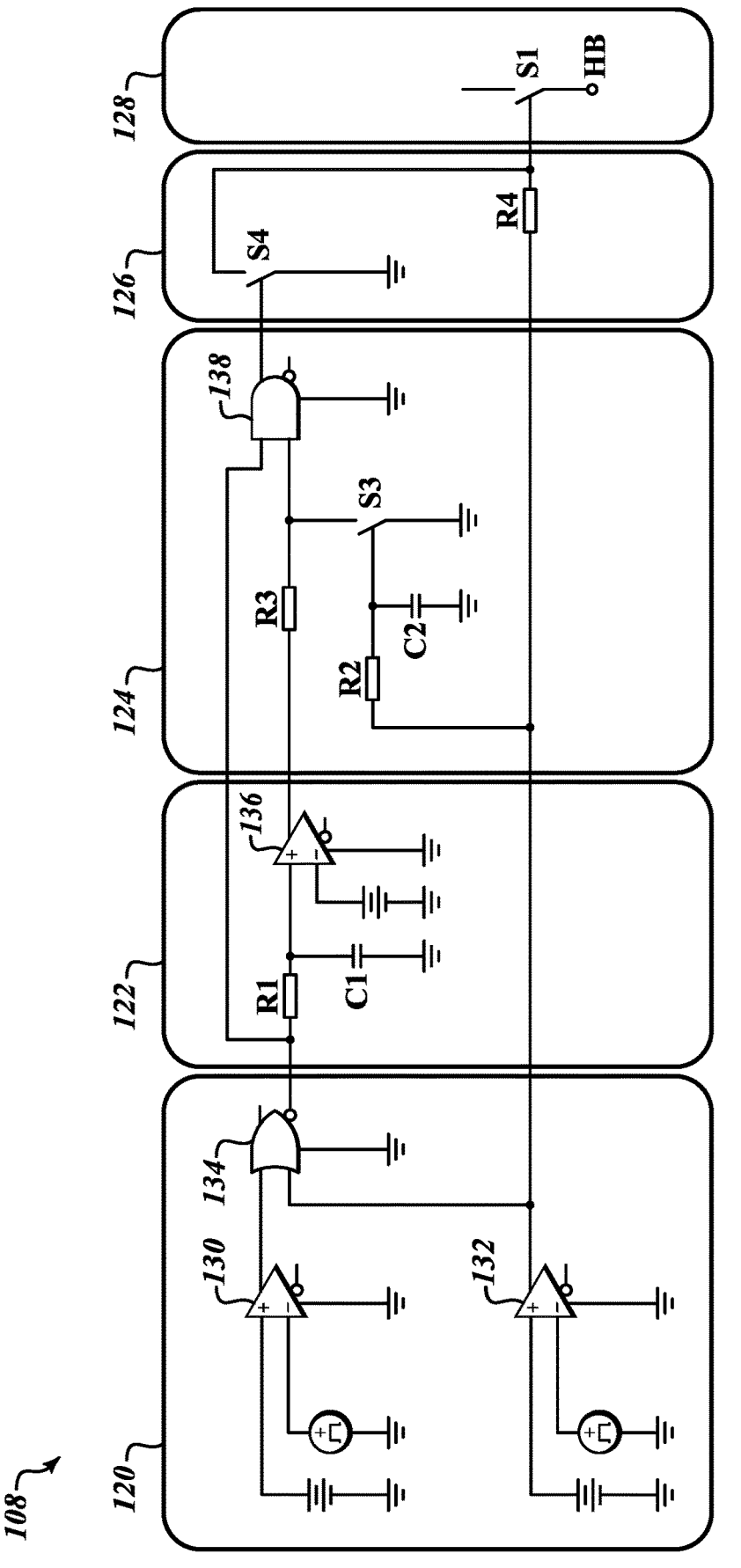
FIG. 4A is a schematic diagram of a half bridge adjustment circuit, in accordance with one embodiment.

FIG. 4A is a schematic diagram of a highside adjustment circuit 108 of the half bridge adjustment circuit 106, in accordance with one embodiment. The highside adjustment circuit 108 of FIG. 4A is one example of a highside adjustment circuit 108 of FIG. 1. The highside adjustment circuit 108 includes a reverse time generator 120, a first deadtime portion generator 122, a second deadtime portion generator 124, an actuator 126, and a portion 128 corresponding to the highside transistor S1. Though not shown, the low side adjustment circuit 106 can have a substantially similar design as the highside adjustment circuit 108.

The reverse time generator 120 includes a comparator 130 that receives a reference voltage and a noninverting terminal and the low side square wave signal from the driver 104 and the inverting terminal. The reverse time generator 120 includes a comparator 130 that receives the highside square wave signal from the driver 104 and an inverting terminal and a reference voltage and the noninverting terminal. The reverse time generator 120 includes a NOR gate 134 having a first input coupled to the output of the comparator 130 and a second input coupled to the output of the comparator 132.

The first deadtime portion generator 122 includes a comparator 136. A resistor R1 is coupled between the output of the NOR gate 134 and the noninverting input of the comparator 136. A capacitor C1 is coupled between ground and the noninverting input of the comparator 136. The inverting input of the comparator 136 is coupled to a reference voltage. The resistor R1 and the capacitor C1 correspond to a low-pass RC filter.

The second deadtime portion generator 124 includes an AND gate 138 having a first input coupled to the output of the NOR gate 134. A resistor R3 is coupled between the output of the comparator 136 and a second input of the AND gate 138. A switch S3 is coupled between the second input of the AND gate 138 and ground. A resistor R2 is coupled between the output of the comparator 132 and a control terminal of the switch S3. A second capacitor C2 is coupled between ground and the control terminal of the switch S3. The resistor R2 and the capacitor C2 form and RC filter that controls the switch S3.

The actuator 126 includes a switch S4 coupled between ground and the gate terminal of the transistor S1. The control gate of the switch S4 is coupled to the output of the AND gate 138 such that the AND gate 138 controls the opening and closing of the switch S4. A resistor R4 is coupled between the output of the comparator 132 and the gate terminal of the transistor S1.

The function of the highside adjustment circuit 108 can be understood in relation to the graphs associated with FIGS. 4B-4E, as set forth in more detail below.

Figure 4B:
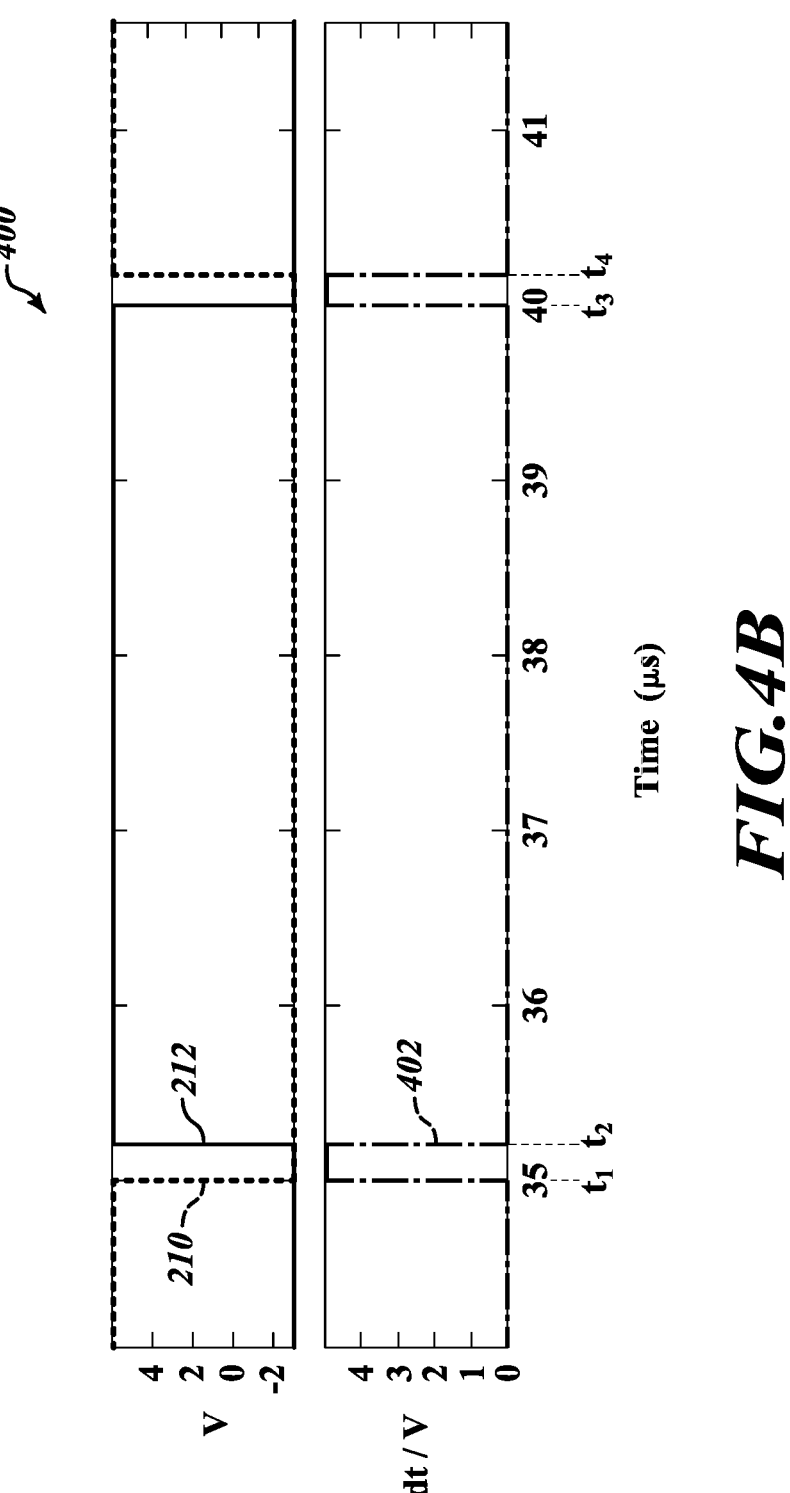
FIGS. 4B-4E are graphs associated with operation of the half bridge adjustment circuit of FIG. 4A, in accordance with one embodiment.

FIG. 4B illustrates a graph 400 illustrating the square waves 210 and 212 provided by the driver 204 to the reverse time generator 120, in accordance with one embodiment. The reverse time signal 402 is the output of the NOR gate 134. Accordingly, when the outputs of the comparators 130 and 132 are low, the output of the NOR gate 134 is high. Accordingly, the reverse time signal 402 is high when the first and second square waves are low.

Figure 4C:
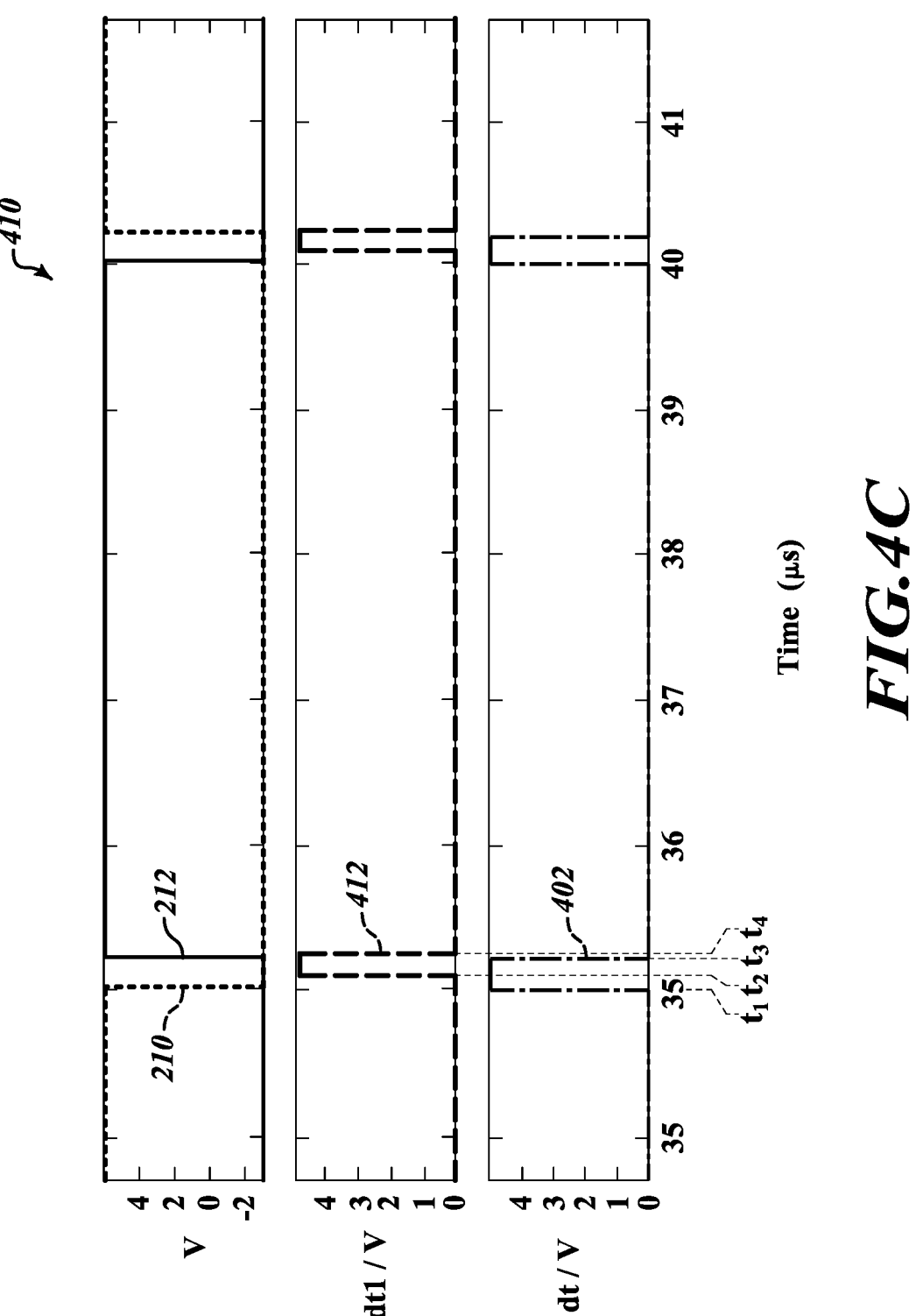

FIG. 4C illustrates a graph 410 associated with the first deadtime portion generator 122, in accordance with one embodiment. FIG. 4C illustrates the first and second square waves 210 and 212, the reverse time signal 402, and a first deadtime portion signal 412. The comparator 136 receives the reverse time signal from the output of the NOR gate 134 via the RC filter of R1 and C1. The first deadtime portion signal 412 is delayed by the RC circuit of R1 and C1 compared with a threshold by the comparator 136. The comparator 136 outputs the first deadtime portion signal 412. The first deadtime portion corresponds to the time between the rising edge of the reverse time signal 402 at time t1 and the rising edge of the first deadtime portion signal 412 at time t2.

Figure 4D:
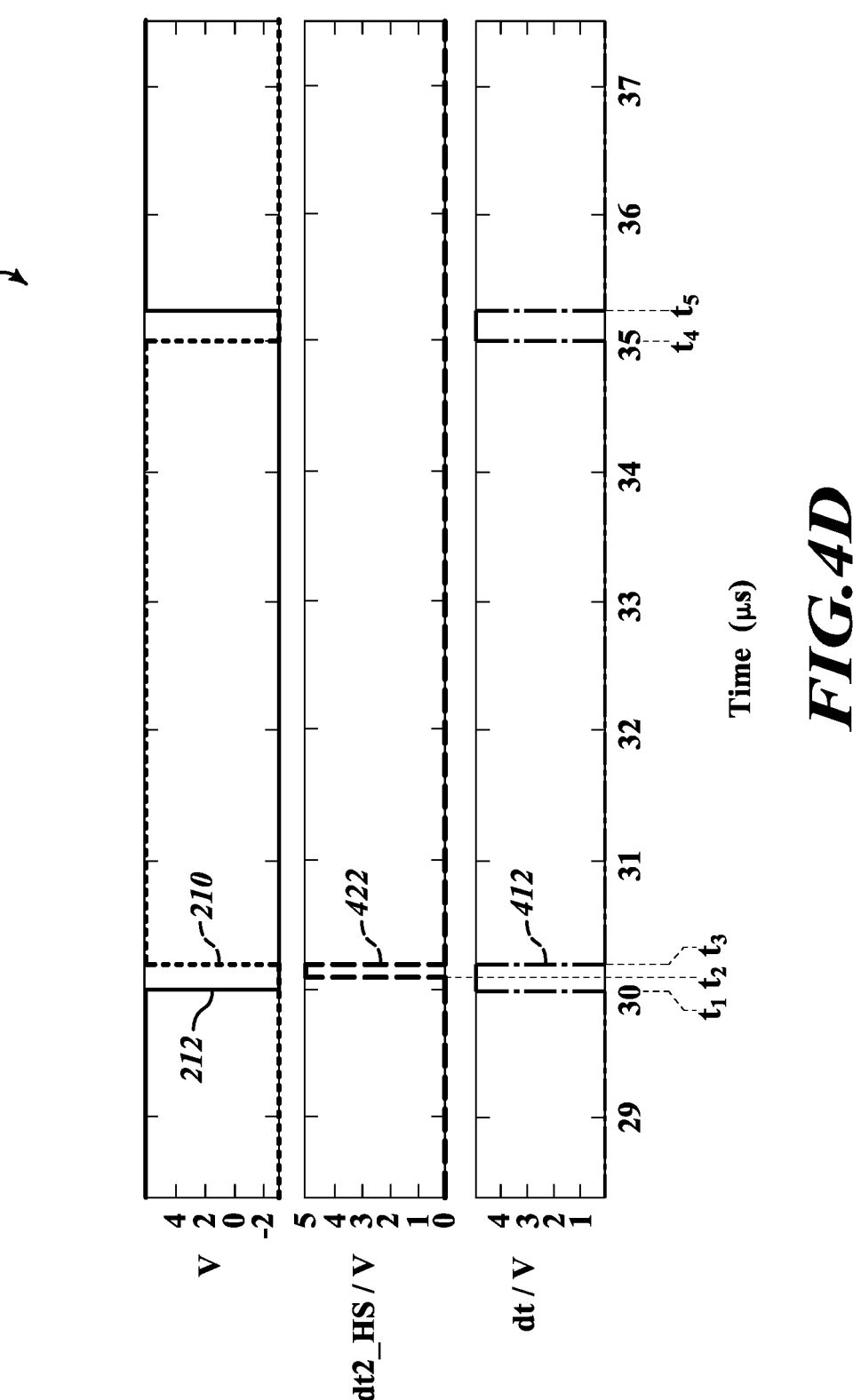

FIG. 4D illustrates a graph 420 associated with the second deadtime portion generator 124, in accordance with one embodiment. The graph 420 illustrates the first and second square wave signals 210 and 212, the reverse time signal 402, and the second deadtime portion signal 422. The second deadtime portion signal 422 is generated as the output of the AND gate 138 and is based on the reverse time signal 402, the first deadtime portion signal 412, and the highside square wave signal via the switch S3. Notably, the second deadtime portion is high only during the second deadtime portion of the deadtime preceding the rising edge of the highside square wave signal 210. The second deadtime portion signal does not go high during the second deadtime between times t4 and t5.

Figure 4E:
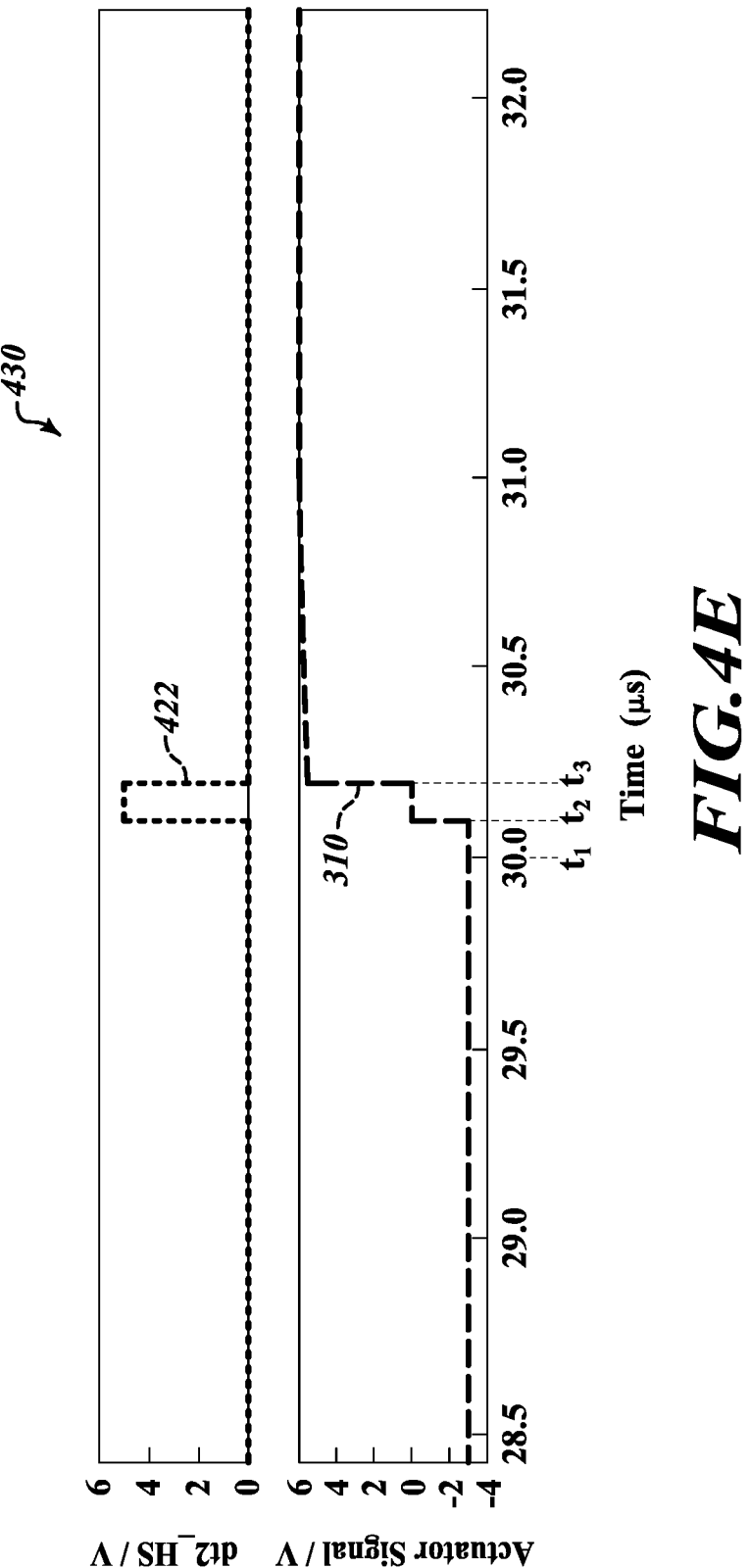

FIG. 4E illustrates a graph 430 associated with the actuator 126 of the highside adjustment circuit 108, in accordance with one embodiment. In particular, the output of the switch S4 is the highside adjustment signal 310 based on the second deadtime portion signal 422. The first deadtime portion dt1 is between times t1 and t2. The second deadtime portion is between times t2 and t3, when the second deadtime portion signal 422 is high. The highside adjustment signal 310 is at the intermediate value between times t2 and t3.

The low side adjustment signal 312 can be generated in substantially the same manner as the high side adjustment signal 310.

Figure 5:
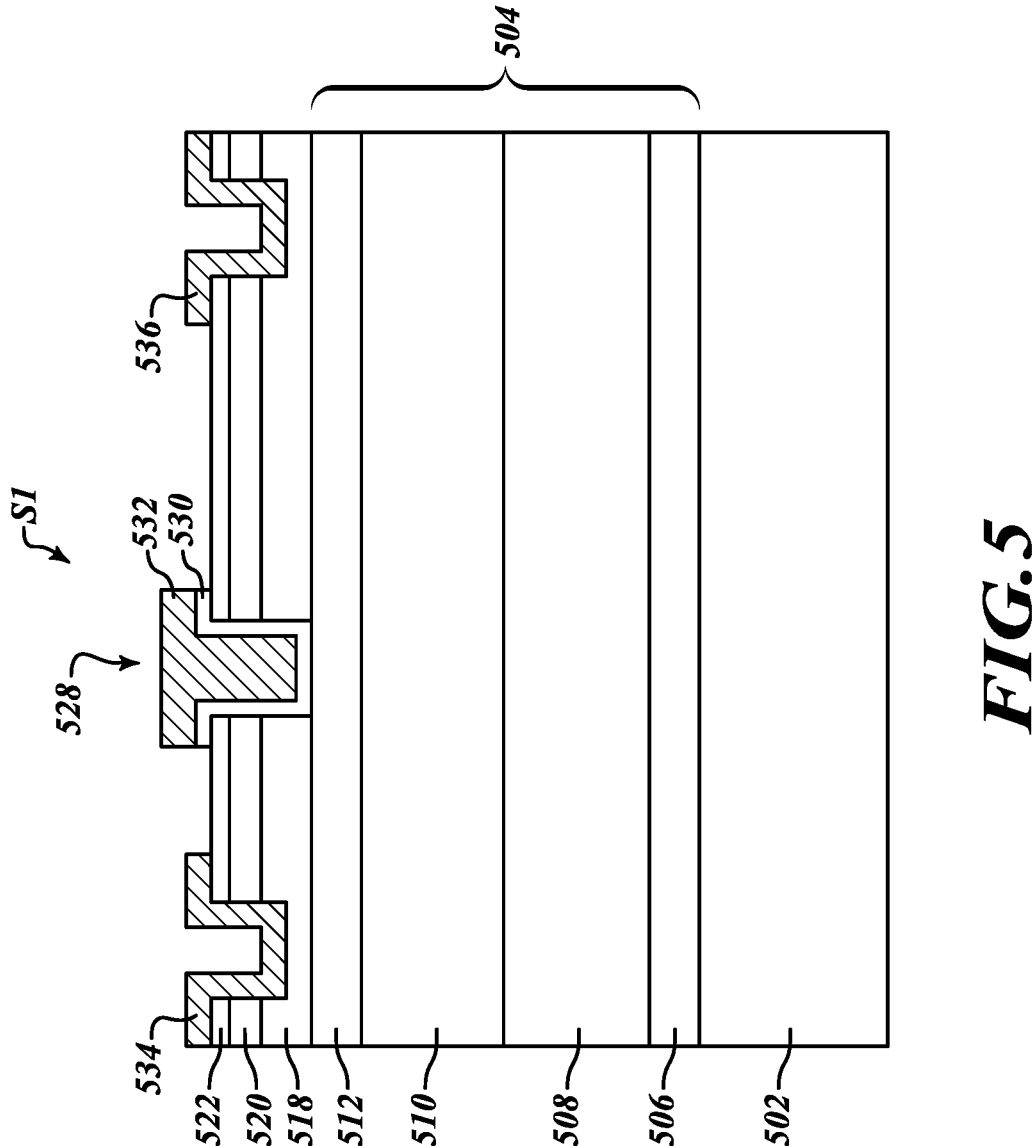
FIG. 5 is a cross-sectional view of an HEMT, in accordance with one embodiment.

FIG. 5 is a cross-sectional view of an integrated circuit including a GaN HEMT S1, in accordance with some embodiments. The HEMT S1 is one example of the transistor S1 of FIGS. 1-4E. Although the HEMT S2 is not shown, the HEMT S2 may have substantially the same structure as the HEMT S1.

The integrated circuit includes a substrate 502, in accordance with one embodiment. The substrate 502 can include a semiconductor material. In one embodiment, the substrate 502 includes silicon. However, the substrate 502 can include other types of semiconductor materials or crystals such as sapphire, silicon carbide, aluminum nitride. In some embodiments, the substrate 502 may include one or more layers of dielectric material. The substrate 502 can include other materials suitable for forming an HEMT.

The integrated circuit includes a stack of layers 504, in accordance with one embodiment. The of layers 504 is grown epitaxially from the substrate 502. The various separate layers can be formed by adjusting the parameters of the epitaxial growth process in situ. For example, the epitaxial growth process can include flowing one or more gases or other materials into a deposition chamber in which the integrated circuit (at this stage part of a semiconductor wafer) is positioned. The temperature, pressure, and materials can be adjusted throughout the epitaxial growth process to form the various layers of the stack 504. In some cases, when one layer of the stack 504 is complete, a purging process may be performed to purge any excess gases or byproducts from the deposition chamber before beginning growth of the next layer.

In one embodiment, the stack 504 includes layer 506 on the substrate 502. In one embodiment, the layer 506 includes aluminum nitride. The aluminum nitride layer 506 may be formed as a precursor to forming a plurality of gallium nitride layers. Aluminum nitride may be selected as the first layer because gallium can be damaging to the substrate 502, in particular when the substrate 502 includes silicon. Accordingly, the epitaxial growth process first forms the layer 506 of aluminum nitride so that layers of gallium nitride may subsequently be formed. Alternatively, other materials can be utilized for the layer 506 and subsequent layers without departing from the scope of the present disclosure.

The stack 504 includes a super lattice 508 formed on the layer 506 during the epitaxial growth process. The super lattice 508 is illustrated as a single layer in FIG. 5. However, in practice, the super lattice 508 may include a large number of layers. In an example in which the layer 506 is aluminum nitride and subsequent layers of gallium nitride are to be formed, the first layer of the super lattice 508 can include a layer of aluminum gallium nitride in which the percentage of aluminum is high and the percentage of gallium is low to enable epitaxial growth from the layer of aluminum nitride. Subsequent layers of the super lattice 508 include aluminum gallium nitride with increasing concentrations of gallium and decreasing concentrations of aluminum. Finally, a top layer of the super lattice 508 may include gallium nitride without any aluminum. The super lattice 508 may include up to 200 layers. The super lattice 508 can include other materials and structures without departing from the scope of the present disclosure.

The stack includes a layer 510 atop the super lattice 508. In an example in which the super lattice 508 is a transitional structure including a plurality of layers that gradually transition from aluminum nitride to gallium nitride, the layer 510 can include gallium nitride. The composition of the layers 510 and 508 may facilitate formation of an HEMT device that can be operated with very high voltages. For example, the composition of the layers 510 and 508 may facilitate operation of an HEMT device with more than 600 V between terminals of the HEMT device. Other materials, thicknesses, and operating voltages can be utilized without departing from the scope of the present disclosure.

A back barrier layer 512 is on the layer 510. In an example in which the layer 510 includes carbon doped gallium nitride, the back barrier layer 512 may include gallium nitride. The gallium nitride back barrier layer 512 may be doped with selected dopant species. The back barrier layer 512 may be between 50 nm and 300 nm in thickness.

The stack includes a channel layer 518 on the back barrier layer 512. In one embodiment, the channel layer 518 is gallium nitride and has a thickness between 50 nm and 150 nm. In one embodiment, the channel layer 518 is intrinsic gallium nitride and does not include any doping. The channel layer 518 may correspond to a layer in which an electron gas is formed during operation of the transistor. Free electrons flow through the channel region based on biasing between source and drain electrodes and the control voltage applied to the gate electrode, as will be set forth in more detail below. The channel layer can have other materials and thicknesses without departing from the scope of the present disclosure.

In one embodiment, the stack includes a barrier layer 520 on the channel layer 518. The barrier layer 520 may include aluminum gallium nitride. The percentage of aluminum may be between 15% and 30%, though other compositions can be utilized without departing from the scope of the present disclosure. The barrier layer 520 can have a thickness between 30 nm and 70 nm. Other compositions and thicknesses can be utilized for the barrier layer 520 without departing from the scope of the present disclosure.

In one embodiment, a dielectric cap layer 522 is positioned on the barrier layer 520. The dielectric layer 522 can include silicon nitride and can have a thickness between 20 nm and 50 nm. Other materials and thicknesses can be utilized without departing from the scope of the present disclosure.

The transistor S1 includes a gate electrode 528, in accordance with one embodiment. The gate electrode 528 can include a gate dielectric 530 and a gate metal 532. The gate dielectric 530 is in contact with the back barrier layer 512, the sidewalls of the layers 518 520, and 522, and on the top surface of the layer 522. The gate dielectric 530 can include aluminum oxide (alumina) or other suitable materials such as AlN, SiN, SiO2.

The gate metal 532 fills the remainder of the gate recess. In particular, the gate metal 532 is in contact with the gate metal 532 and on top of the dielectric cap layer 522. The gate metal 532 can include tungsten and can be deposited by PVD, ALD, CVD, or other suitable deposition processes. The gate metal 532 can include other materials and configurations without departing from the scope of the present disclosure. For example, while the gate metal 532 is shown as a single gate metal, in practice, multiple gate metals may be present.

The transistor S1 includes a source electrode 534 and a drain electrode 536, in accordance with one embodiment. The source electrode 534 and the drain electrode 536 can be formed after formation of the gate electrode 528. In particular, a photolithography process can be performed to form trenches that extend partially into the channel layer 518. A source/drain metal can then be deposited and patterned to form the source electrode 534 and the drain electrode 536. The source/drain metal can include TiAl, TaAl, Au, or other suitable conductive materials. The source/drain metal can be deposited by PVD, ALD, CVD, or other suitable deposition processes. As can be seen, the source electrode 534 is closer to the gate electrode 528 than is the drain electrode 536. This can be beneficial in the electrical function of the HEMT S1.

The HEMT S1 can include various other layers including passivation layers and other dielectric layers to isolate and protect the source/drain metals in the gate electrode 528. The HEMT can be operated by applying a control voltage to the gate electrode 528 and biasing the source electrode 534 and the drain electrode 536. Depending on the control and bias voltages, the HEMT may be turned on or turned off. When the HEMT is turned on, the current of the electron gas may flow through the channel layer 518 and under the bottom of the gate electrode 528 between the drain electrode 536 and the source electrode 534.

Figure 6:
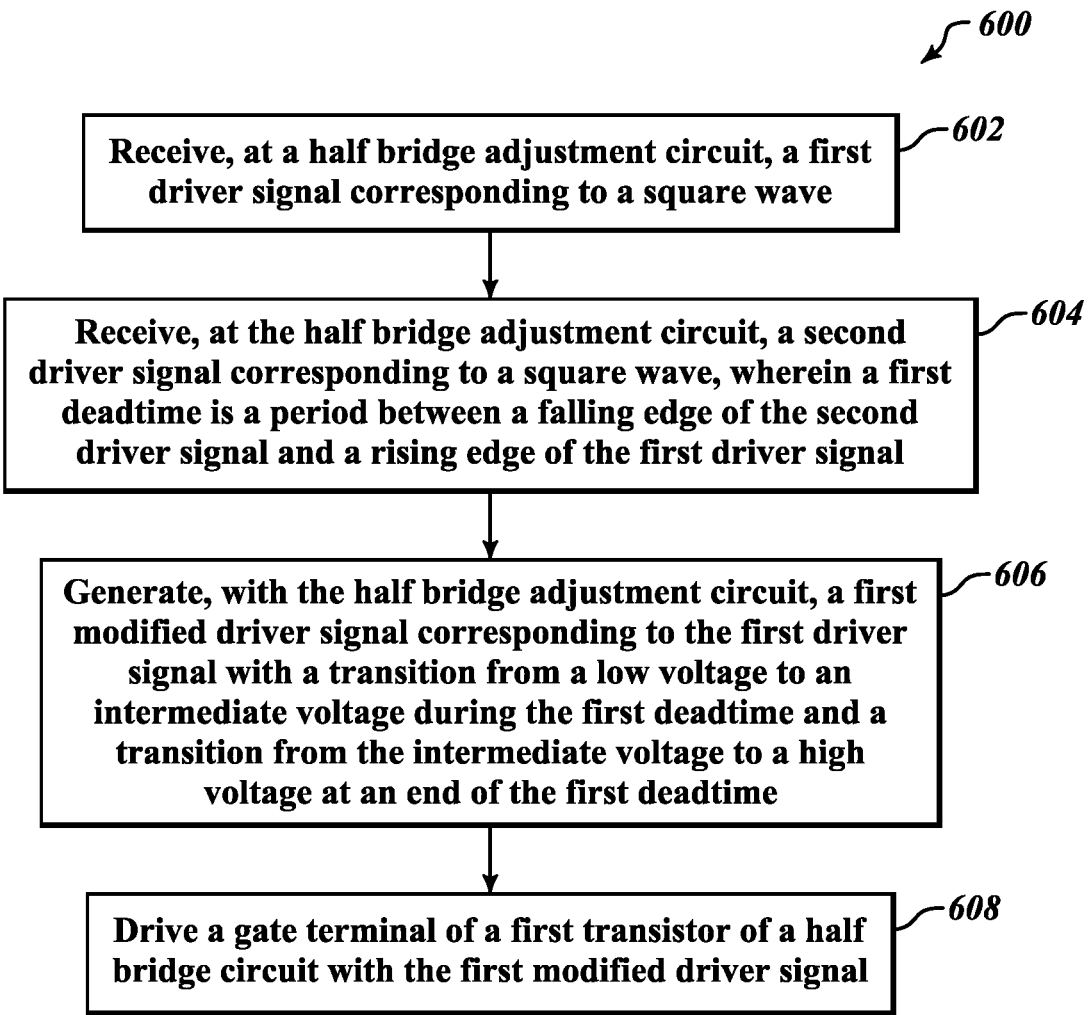
FIG. 6 is a flow diagram of a method for operating a half bridge circuit, in accordance with one embodiment.

FIG. 6 is a flow diagram of a method 600, in accordance with one embodiment. The method 600 can utilize components, processes, systems, and structures shown and described in relation to foregoing Figures. At 602, the method 600 includes receiving, at a half bridge adjustment circuit, a first driver signal corresponding to a square wave. At 604, the method 600 includes receiving, at the half bridge adjustment circuit, a second driver signal corresponding to a square wave, wherein a first deadtime is a period between a falling edge of the second driver signal and a rising edge of the first driver signal. At 606, the method 600 includes generating, with the half bridge adjustment circuit, a first modified driver signal corresponding to the first driver signal with a transition from a low voltage to an intermediate voltage during the first deadtime and a transition from the intermediate voltage to a high voltage at an end of the first deadtime. At 608, the method 600 includes driving a gate terminal of a first transistor of a half bridge circuit with the first modified driver signal.

FIG. 7 is a flow diagram of a method 700, in accordance with one embodiment. The method 700 can utilize components, processes, systems, and structures shown and described in relation to foregoing Figures. At 702, the method 700 includes providing a first square wave from a driver to half bridge adjustment circuit coupled between the driver and a half-bridge resonant converter including a high side GaN high electron mobility transistor (HEMT) and a low side GaN HEMT, the first square wave having a high voltage value corresponding to a turn-on voltage of the HEMT and a low voltage value corresponding to a turn-off voltage of the HEMT and having a value less than 0 V. At 704, the method 700 includes providing a second square wave from the driver to the half bridge adjustment circuit, the first and second square waves having a relative phase that provides a deadtime during which both the first square wave and the second square wave are low. At 706, the method 700 includes generating with the half bridge adjustment circuit, a first modified square wave in which the deadtime is divided into a first portion and a second portion, the first modified square wave being at the low voltage value during the first portion and at an intermediate voltage during the second portion. At 708, the method 700 includes applying the first modified square wave to a gate terminal of the high side GaN HEMT.

In one embodiment, a method includes receiving, at a half bridge adjustment circuit, a first driver signal corresponding to a square wave and receiving, at the half bridge adjustment circuit, a second driver signal corresponding to a square wave. A first deadtime is a period between a falling edge of the second driver signal and a rising edge of the first driver signal. The method includes generating, with the half bridge adjustment circuit, a first modified driver signal corresponding to the first driver signal with a transition from a low voltage to an intermediate voltage during the first deadtime and a transition from the intermediate voltage to a high voltage at an end of the first deadtime. The method includes driving a gate terminal of a first transistor of a half bridge circuit with the first modified driver signal.

In one embodiment, the half bridge adjustment circuit and the driver are implemented in a same integrated circuit die to the half bridge circuit.

In one embodiment, the driver is implemented in an integrated circuit and the half bridge adjustment circuit is coupled between the integrated circuit and the half bridge circuit.

In one embodiment, a second deadtime is a period between a falling edge of the first driver signal and a rising edge of the second driver signal. The method includes generating, with the half bridge adjustment circuit, a second modified driver signal corresponding to the second driver signal with a transition from the low voltage to the intermediate voltage during the second deadtime and a transition from the intermediate voltage to the high voltage at an end of the second deadtime. The method includes driving a gate terminal of a second transistor of the half bridge circuit with the second modified driver signal.

In one embodiment, the method includes generating, with the half bridge adjustment circuit, a deadtime signal having a high logic level during the first deadtime and during the second deadtime and having a low logic level outside the first deadtime and the second deadtime.

In one embodiment, the method includes generating, with the half bridge adjustment circuit, a first deadtime control signal. The first deadtime control signal includes a first transition during the first deadtime and a second transition at an end of the first deadtime.

In one embodiment, the first modified driver signal transitions to the intermediate voltage responsive to the first transition of the first deadtime control signal. The first modified driver signal transitions to the high voltage response to the second transition of the first deadtime control signal.

In one embodiment, the method includes generating, with the half bridge adjustment circuit, a second deadtime control signal. The second deadtime control signal includes a first transition during the second deadtime and a second transition at an end of the second deadtime.

In one embodiment, the second modified driver signal transitions to the intermediate voltage responsive to the first transition of the second deadtime control signal. The second modified driver signal transitions to the high voltage in response to the second transition of the second deadtime control signal.

In one embodiment, the low voltage level is less than 0 V and the intermediate voltage is 0 V.

In one embodiment, the first transistor is a GaN transistor.

In one embodiment, a device includes half bridge circuit. The half bridge circuit includes a high side transistor and a low side transistor coupled to the high side transistor at an intermediate node. The device includes a driver configured to generate a high side driver signal corresponding to a square wave and a low side driver signal corresponding to a square wave. A first deadtime is a period between a falling edge of the low side driver signal and a rising edge of the high side driver signal. The device includes a half bridge adjustment circuit coupled between the driver and the half bridge circuit. The half bridge adjustment circuit is configured to generate a modified high side driver signal corresponding to the high side driver signal with a transition from a low voltage to an intermediate voltage during the first deadtime and a transition from the intermediate voltage to a high voltage at an end of the first deadtime. The half bridge adjustment circuit is configured to drive a gate terminal of the high side transistor of a half bridge circuit with the modified high side driver signal.

In one embodiment, the device includes an integrated circuit. The driver and the half bridge adjustment circuit are implemented in the integrated circuit.

In one embodiment, the device includes a circuit board and an integrated circuit. The integrated circuit includes the driver. The integrated circuit, the half bridge adjustment circuit, and the half bridge circuit are mounted to the circuit board.

In one embodiment, a second deadtime is a period between a falling edge of the first driver signal and a rising edge of the second driver signal. The half bridge adjustment circuit is configured to generate a modified low side driver signal corresponding to the low side driver signal with a transition from the low voltage to the intermediate voltage during the second deadtime and a transition from the intermediate voltage to the high voltage at an end of the second deadtime. The half bridge adjustment circuit is configured to drive a gate terminal of the low side transistor with the modified low side driver signal.

In one embodiment, the half bridge adjustment circuit is configured to generate a deadtime signal having a high logic level during the first deadtime and during the second deadtime and having a low logic level outside the first deadtime and the second deadtime. The half bridge adjustment circuit is configured to generate a first deadtime control signal including a first transition during the first deadtime and a second transition at an end of the first deadtime.

In one embodiment, the half bridge adjustment circuit is configured to generate a second deadtime control signal including a first transition during the second deadtime and a second transition at an end of the second deadtime. The second modified driver signal transitions to the intermediate voltage responsive to the first transition of the second deadtime control signal. The second modified driver signal transitions to the high voltage response to the second transition of the second deadtime control signal.

In one embodiment, a method includes providing a first square wave from a driver to half bridge adjustment circuit coupled between the driver and a half-bridge resonant converter including a high side GaN high electron mobility transistor (HEMT) and a low side GaN HEMT. The first square wave has a high voltage value corresponding to a turn-on voltage of the HEMT and a low voltage value corresponding to a turn-off voltage of the HEMT and having a value less than 0 V. The method includes providing a second square wave from the driver to the half bridge adjustment circuit. The first and second square waves have a relative phase that provides a deadtime during which both the first square wave and the second square wave are low. The method includes generating with the half bridge adjustment circuit, a first modified square wave in which the deadtime is divided into a first portion and a second portion. The first modified square wave is at the low voltage value during the first portion and at an intermediate voltage during the second portion. The method includes applying the first modified square wave to a gate terminal of the high side GaN HEMT.

In one embodiment, the method includes generating, with the half-bridge adjustment circuit, a second modified square wave in which the deadtime is divided into a first half and a second half. The second modified square wave is at the low voltage value during the first portion and at an intermediate voltage during the second portion. The method includes applying the second modified square wave to a gate terminal of the low side GaN HEMT.

In one embodiment, the half bridge adjustment circuit includes a NOR gate configured to receive the first square wave, a comparator coupled to the output of the NOR gate, an AND gate coupled to an output of the NOR gate, and a switch coupled between the AND gate and the gate terminal of the high side GaN HEMT.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

receiving, at a half bridge adjustment circuit, a first driver signal corresponding to a square wave;

receiving, at the half bridge adjustment circuit, a second driver signal corresponding to a square wave, wherein a first deadtime is a period between a falling edge of the second driver signal and a rising edge of the first driver signal, wherein the first deadtime includes a first portion and a second portion following the first portion;

generating, with the half bridge adjustment circuit, a first modified driver signal corresponding to the first driver signal with a transition from a low voltage to an intermediate voltage at a beginning of the second portion of the first deadtime and a transition from the intermediate voltage to a high voltage at an end of the first deadtime, wherein the first modified driver signal remains flat at the low voltage during the first portion of the first deadtime; and driving a gate terminal of a first transistor of a half bridge circuit with the first modified driver signal, wherein a second deadtime is a period between a falling edge of the first driver signal and a rising edge of the second driver signal;

generating, with the half bridge adjustment circuit, a second modified driver signal corresponding to the second driver signal with a transition from the low voltage to the intermediate voltage during the second deadtime and a transition from the intermediate voltage to the high voltage at an end of the second deadtime; and driving a gate terminal of a second transistor of the half bridge circuit with the second modified driver signal.

2. The method of claim 1, generating the first and second driver signals with a driver, wherein the half bridge adjustment circuit and the driver are implemented in a same integrated circuit die to the half bridge circuit.

3. The method of claim 1, generating the first and second driver signals with a driver, wherein the driver is implemented in an integrated circuit, wherein the half bridge adjustment circuit is coupled between the integrated circuit and the half bridge circuit.

4. The method of claim 1, comprising generating, with the half bridge adjustment circuit, a deadtime signal having a high logic level during the first deadtime and during the second deadtime and having a low logic level outside the first deadtime and the second deadtime.

5. The method of claim 4, comprising generating, with the half bridge adjustment circuit, a first deadtime control signal, wherein the first deadtime control signal includes a first transition during the first deadtime and a second transition at an end of the first deadtime.

6. The method of claim 5, wherein the first modified driver signal transitions to the intermediate voltage responsive to the first transition of the first deadtime control signal, wherein the first modified driver signal transitions to the high voltage response to the second transition of the first deadtime control signal.

7. The method of claim 6, generating, with the half bridge adjustment circuit, a second deadtime control signal, wherein the second deadtime control signal includes a first transition during the second deadtime and a second transition at an end of the second deadtime.

8. The method of claim 5, wherein the second modified driver signal transitions to the intermediate voltage responsive to the first transition of the second deadtime control signal, wherein the second modified driver signal transitions to the high voltage in response to the second transition of the second deadtime control signal.

9. The method of claim 1, wherein the low voltage level is less than 0 V; and
wherein the intermediate voltage is 0 V.

10. The method of claim 1, wherein the first transistor is a GaN transistor.

11. A device, comprising:
a half bridge circuit including:
a high side transistor; and
a low side transistor coupled to the high side transistor at an intermediate node;
a driver configured to generate a high side driver signal corresponding to a square wave and a low side driver signal corresponding to a square wave, wherein a first deadtime is a period between a falling edge of the low side driver signal and a rising edge of the high side driver signal, wherein the first deadtime includes a first portion and a second portion following the first portion;
a half bridge adjustment circuit coupled between the driver and the half bridge circuit and configured to:
generate a modified high side driver signal corresponding to the high side driver signal with a transition from a low voltage to an intermediate voltage at a beginning of the second portion of the first deadtime and a transition from the intermediate voltage to a high voltage at an end of the first deadtime, wherein the first modified driver signal remains flat at the low voltage during the first portion of the first deadtime; and
drive a gate terminal of the high side transistor of a half bridge circuit with the modified high side driver signal, wherein:
a second deadtime is a period between a falling edge of the first driver signal and a rising edge of the second driver signal;
the half bridge adjustment circuit is configured to generate a modified low side driver signal corresponding to the low side driver signal with a transition from the low voltage to the intermediate voltage during the second deadtime and a transition from the intermediate voltage to the high voltage at an end of the second deadtime; and
the half bridge adjustment circuit is configured to drive a gate terminal of the low side transistor with the modified low side driver signal.

12. The device of claim 11, comprising an integrated circuit, wherein the driver and the half bridge adjustment circuit are implemented in the integrated circuit.

13. The device of claim 11, comprising:
a circuit board; and an integrated circuit including the driver, wherein the integrated circuit, the half bridge adjustment circuit, and the half bridge circuit are mounted to the circuit board.

14. The device of claim 11, wherein the half bridge adjustment circuit is configured to generate a deadtime signal having a high logic level during the first deadtime and during the second deadtime and having a low logic level outside the first deadtime and the second deadtime, wherein the half bridge adjustment circuit is configured to generate a first deadtime control signal including a first transition during the first deadtime and a second transition at an end of the first deadtime.

15. The device of claim 14, wherein the half bridge adjustment circuit is configured to generate a second deadtime control signal including a first transition during the second deadtime and a second transition at an end of the second deadtime, wherein the second modified driver signal transitions to the intermediate voltage responsive to the first transition of the second deadtime control signal, wherein the second modified driver signal transitions to the high voltage response to the second transition of the second deadtime control signal.

16. A method, comprising:
providing a first square wave from a driver to half bridge adjustment circuit coupled between the driver and a half-bridge resonant converter including a high side GaN high electron mobility transistor (HEMT) and a low side GaN HEMT, the first square wave having a high voltage value corresponding to a turn-on voltage of the HEMT and a low voltage value corresponding to a turn-off voltage of the HEMT and having a value less than 0 V;
providing a second square wave from the driver to the half bridge adjustment circuit, the first and second square waves having a relative phase that provides a deadtime during which both the first square wave and the second square wave are at the low voltage value; and
generating with the half bridge adjustment circuit, a first modified square wave in which the deadtime is divided into a first portion and a second portion, the first modified square wave being at the low voltage value during the first portion and at an intermediate voltage value during the second portion and including a transition from the low voltage value to the intermediate voltage value at a beginning of the second portion of the first deadtime, wherein the first modified driver signal remains flat at the low voltage value during the first portion of the first deadtime;
applying the first modified square wave to a gate terminal of the high side GaN HEMT;
generating, with the half-bridge adjustment circuit, a second modified square wave in which the deadtime is divided into a first half and a second half, the second modified square wave being at the low voltage value during the first portion and at the intermediate voltage value during the second portion; and
applying the second modified square wave to a gate terminal of the low side GaN HEMT.

17. The method of claim 16, wherein the half bridge adjustment circuit includes a NOR gate configured to receive the first square wave, a comparator coupled to the output of the NOR gate, an AND gate coupled to an output of the NOR gate, and a switch coupled between the AND gate and the gate terminal of the high side GaN HEMT.

* * * * *